United States Patent
Sawada et al.

(10) Patent No.: US 8,514,426 B2
(45) Date of Patent: Aug. 20, 2013

(54) IMAGE FORMING APPARATUS AND COMPOSITE DATA PROCESSING METHOD

(75) Inventors: Kenichi Sawada, Toyohashi (JP);
Kazuyuki Kawabata, Toyokawa (JP);
Hideyuki Hashimoto, Toyokawa (JP);
Takeshi Hibino, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1175 days.

(21) Appl. No.: 11/161,985

(22) Filed: Aug. 24, 2005

(65) Prior Publication Data
US 2006/0245019 A1    Nov. 2, 2006

(30) Foreign Application Priority Data

Apr. 27, 2005    (JP) ................................ 2005-129975
Apr. 27, 2005    (JP) ................................ 2005-129976

(51) Int. Cl.
*G06F 3/12*    (2006.01)
(52) U.S. Cl.
USPC .............. 358/1.15; 700/94; 358/1.1; 358/1.9; 382/118
(58) Field of Classification Search
USPC ............... 358/518, 3.23, 530, 523–525, 1.13, 358/1.14, 1.15
See application file for complete search history.

(56) References Cited

U.S. PATENT DOCUMENTS

| | | | |
|---|---|---|---|
| 5,802,179 A | 9/1998 | Yamamoto | |
| 5,821,987 A * | 10/1998 | Larson | 348/14.15 |
| 2002/0065885 A1 * | 5/2002 | Buonanno et al. | 709/205 |
| 2002/0099661 A1 * | 7/2002 | Kii et al. | 705/51 |
| 2004/0080768 A1 * | 4/2004 | Larson | 358/1.13 |
| 2005/0021713 A1 * | 1/2005 | Dugan et al. | 709/223 |
| 2005/0044183 A1 * | 2/2005 | Meunier et al. | 709/219 |
| 2006/0037055 A1 * | 2/2006 | Hashimoto et al. | 725/86 |

FOREIGN PATENT DOCUMENTS

| | | |
|---|---|---|
| JP | 7--203100 | 8/1995 |
| JP | 08-116396 | 5/1996 |
| JP | 08-335992 | 12/1996 |
| JP | 03-058661 | 3/1999 |

(Continued)

OTHER PUBLICATIONS

Notification of Reasons for Rejection issued in corresponding Japanese Patent Application No. 2005-129976, and translation thereof.

(Continued)

*Primary Examiner* — Twyler Haskins
*Assistant Examiner* — Brendan McCommas
(74) *Attorney, Agent, or Firm* — Buchanan Ingersoll & Rooney PC

(57) ABSTRACT

An audio data storing unit stores therein audio data, and an image data storing unit stores therein image data. A control information storing unit stores a playback method used for playing back the audio data and a print method used for printing out the image data. The playback method indicates whether the audio data should be played back when a receiving unit receives the composite data, or should be played back after an instruction is input by a user. The print method indicates whether the image data should be printed out when the receiving unit receives the composite data, or should be printed out after an instruction is input by the user. A speaker unit plays back the audio data in accordance with the playback method. A printer unit prints out the image data in accordance with the print method.

6 Claims, 14 Drawing Sheets

(56) References Cited

FOREIGN PATENT DOCUMENTS

| | | |
|---|---|---|
| JP | 11-261746 | 9/1999 |
| JP | 2000-244681 | 9/2000 |
| JP | 2000-253200 | 9/2000 |
| JP | 2000-270135 | 9/2000 |
| JP | 2001-313763 | 11/2001 |
| JP | 2003-046914 | 2/2003 |
| JP | 2003-189045 | 7/2003 |
| JP | 2003-283754 | 10/2003 |
| JP | 2003-333223 | 11/2003 |
| JP | 2004-135059 | 4/2004 |

OTHER PUBLICATIONS

Notification of Reasons for Rejection issued in corresponding Japanese Patent Application No. 2005-129975, and translation thereof.

* cited by examiner

FIG.8

| FORWARDING DISTINATION | IMAGE DATA | AUDIO DATA |
|---|---|---|
| abc@def.com | FORWARD | FORWARD |
| ... | ... | ... |
| ghi@jkl.co.jp | FORWARD | NOT FORWARD |
| ... | ... | ... |
| mno@pqr.ne.jp | NOT FORWARD | FORWARD |
| ... | ... | ... |

FIG.10

```
JOB OPERATION - #001

JOB INFORMATION    SENDER              KONICA MINOLTA HD
                   TITLE               ANNIVERSARY
                   REGISTRATION DATE   APRIL 1, 2005
                   DATA FORMAT         IMAGE + AUDIO
                   NUMBER OF PAGES     2
                   DURATION OF AUDIO (SEC)   15

[PRINT]  [PLAYBACK]  [FORWARD]  [DELETE]
```

FIG.13

```
JOB OPERATION -- #002

JOB INFORMATION    SENDER            KONICA MINOLTA HD
                   TITLE             NEW PRODUCT
                   REGISTRATION DATE APRIL 4, 2005
                   DATA FORMAT       IMAGE
                   NUMBER OF PAGES   10

[ PRINT ]  [PLAYBACK] [FORWARD] [DELETE]
```

FIG.14

```
JOB OPERATION - #003

JOB INFORMATION    SENDER            KONICA MINOLTA HD
                   TITLE             CM SONG
                   REGISTRATION DATE APRIL 5, 2005
                   DATA FORMAT       AUDIO
                   DURATION OF       18
                   AUDIO (SEC)

[PRINT]  [PLAYBACK]  [FORWARD]  [DELETE]
```

IMAGE FORMING APPARATUS AND COMPOSITE DATA PROCESSING METHOD

CROSS-REFERENCE TO RELATED APPLICATIONS

This application is based on applications NO. 2005-129975 and NO. 2005-129976 filed in Japan, the contents of which are hereby incorporated by reference.

BACKGROUND OF THE INVENTION (1) Field of the Invention

The present invention relates to an image forming apparatus that receives composite data including image data and audio data. The present invention particularly relates to a technique for improving convenience of users who use the received composite data.

(2) Description of the Related Art

In recent years, as the Internet has been developed and become widespread, an Internet facsimile (fax) system has been developed and become widespread (ITU-T recommendation T.37: Procedures for the transfer of facsimile data via store and forward on the Internet). Using an e-mail, the user can send not only image data, but also audio data. Examples of a technique to send and receive a combination of image data and audio data are described next.

U.S. Pat. No. 5,802,179 discloses the following technique. Images, such as characters and figures, and a two-dimensional bar-code, representing audio data related to the images, are both printed on a piece of paper in advance. The images and the two-dimensional bar-code are read from the paper and displayed by an apparatus. Upon receiving a designation of a location included in the displayed image, the apparatus outputs audio data, which is related to the location, as a sound.

Furthermore, Japanese laid-open patent application publication NO. H07-203100 discloses the following technique. Composite data is generated by combining image data and audio data together and encoding the combined data. The composite data is faxed to a destination. At the destination, the image data is decoded and printed out, and the audio data is decoded and output as a sound.

These techniques, however, have a problem. A fax machine is shared by people in many cases. If audio data is output as a sound/voice by a fax machine that receives the audio data, a person who is not an intended receiver of the audio data may hear the sound. This may lead to leakage of confidential information or invasion of the privacy of the intended receiver. Therefore, there is demand for measures to improve security.

However, it is undesirable that the convenience of users is hampered by the measures. Such a problem is not specific to fax machines, but might turn up in general image forming apparatuses.

In addition, the two-dimensional bar-code can be read only with a bar-code reader. Furthermore, it is undesirable and unsightly that the two-dimensional bar-code occupies too much space on a piece of paper.

SUMMARY OF THE INVENTION

The present invention is made in view of the above-described problem, and provides an image forming apparatus that receives composite data including image data and audio data. The first object of the present invention is to provide an image forming apparatus that precludes data that can not be used by a destination device, and improve convenience of the users. The second object of the present invention is to provide an image forming apparatus that improves security while improving convenience of the users.

The first object is fulfilled by an image forming apparatus comprising: a receiving unit operable to receive composite data including image data and audio data; a forwarding method storing unit operable to prestore therein a forwarding method that indicates, for each forwarding destination, whether the image data and/or the audio data should be forwarded; and a forwarding unit operable to forward the composite data in accordance with the forwarding method.

With the stated structure, the image forming apparatus can forward only audio data if the destination device is not suitable for printing and displaying image data, like a mobile telephone, and forward only image data if the destination device does not have a function for playing back a sound, like common fax machines. Therefore, the image forming apparatus can preclude data that can not be used by the destination device, and improve convenience of the users, and reduce processing time and processing load for forwarding the unnecessary data. Accordingly, the forwarding unit may forward only the audio data in accordance with the forwarding method if the forwarding destination can not output the image data. Also, the forwarding unit may forward only the image data in accordance with the forwarding method if the forwarding destination can not output the audio data.

The image forming apparatus according to the present invention may further comprise: a thumbnail image generating unit operable to generate thumbnail image data from the image data, wherein the forwarding unit forwards the image data or the thumbnail image data instead of the image data, depending on a manner in which the forwarding destination outputs the image data. With the stated structure, the image data can be displayed by the destination device even if the destination device does not have a screen that is wide enough to display the image data, like a portable terminal device.

The image forming apparatus according to the present invention may further comprise an image-to-text conversion unit operable to convert the image data to text data by character recognition, wherein the forwarding unit forwards the text data instead of or in addition to the image data. With the stated structure, even if the destination device does not have a screen that is wide enough to display the image data, and if the image data is not suitable for being displayed as a thumbnail, like an image of a text document, the approximation of the image data can be adequately conveyed to the user by forwarding text data.

The image forming apparatus according to the present invention may further comprise an audio-to-text conversion unit operable to convert the audio data to text data by audio recognition, wherein the forwarding unit forwards the text data instead of or in addition to the audio data. The stated structure can improve convenience of the user because even if the destination device can not playback a sound, the approximation of the audio data can be conveyed to the user with texts.

The image forming apparatus according to the present invention may further comprise: a composite data storing unit operable to store therein the composite data; a request receiving unit operable to receive a request for forwarding the composite data that is stored in the composite data storing unit, wherein the forwarding unit forwards the composite data relating to the request, in accordance with the forwarding method. With the stated structure, it becomes possible to gain the same effect as described above not only in the case where the image forming apparatus receives the composite data, but also in the case where the image forming apparatus forwards the composite data that is stored therein, based on a user's request for forwarding the composite data.

The receiving unit may receive the composite data including the image data and the audio data and being attached to an E-mail, and the forwarding unit may attach the composite data to an E-mail, and transmit the E-mail. With the stated structure, it becomes possible to avoid disadvantages caused by the two-dimensional bar-code, representing the audio data and occupying a part of the image. This is because the image forming apparatus with the stated structure can receive and forward the audio data without including the audio data in the image data. Here, it is preferable that the receiving unit receives an E-mail to which the image data is attached in conformity with a standard of an internet facsimile, and the forwarding unit forwards an E-mail to which the image data is attached in conformity with the standard of the internet facsimile The second object is fulfilled by an image forming apparatus, comprising: a receiving unit operable to receive composite data including image data and audio data; a playback method storing unit operable to prestore therein a playback method that indicates whether the audio data included in the composite data should be played back when the receiving unit receives the audio data, or should be played back after an instruction is input by a user; and a playback unit operable to playback the audio data in accordance with the playback method.

With the stated structure, the image forming apparatus can automatically play back the audio data upon receiving the audio data in the case where there is no risk of leakage of confidential information at the time of the play back attributable to the location of the image forming apparatus. If there is such a risk, the image forming apparatus can play back the audio data only when instructed by the user. Therefore, the image forming apparatus can improve security, while improving convenience of the user.

The image forming apparatus may further comprise: a print method storing unit operable to prestore therein a print method that indicates whether the image data included in the composite data should be printed when the receiving unit receives the composite data, or should be printed after an instruction is input by the user; and a printing unit operable to print the image data in accordance with the print method. With the stated structure, it becomes possible to improve security of the image data as well as the audio data. Also, it becomes possible to adjust the timing of printing out the image data to the timing of playing back the audio data. This further improves convenience of the user.

The image forming apparatus may further comprise: a composite data storing unit operable to store therein the composite data; a delete method storing unit operable to prestore a delete method that indicates whether the composite data (i) should be deleted after either the image data or the audio data, included in the composite data, is printed or played back, or (ii) should be deleted after an instruction is input by the user; and a deleting unit operable to delete the composite data With the stated structure, the image forming apparatus can automatically delete the image data that has not been printed out or audio data that has not been played back by setting the method for deleting in advance. This improves convenience of the user.

The receiving unit may receive the composite data including the image data and the audio data and being attached to an E-mail. With the stated structure, it becomes possible to avoid disadvantages caused by the two-dimensional bar-code, representing the audio data and occupying a part of the image. This is because the image forming apparatus with the stated structure can receive and forward the audio data without including the audio data in the image data. Here, It is preferable that the receiving unit receives an E-mail to which the image data is attached in conformity with a standard of an internet facsimile.

A composite data processing method according to the present invention is a composite data processing method, comprising steps of: receiving composite data including image data and audio data; prestoring a forwarding method that indicates, for each forwarding destination, whether to forward the image data and/or the audio data; and forwarding the composite data in accordance with the forwarding method. This fulfills the first object.

A composite data processing method according to the present invention is a receiving composite data including image data and audio data; prestoring a playback method that indicates whether the audio data should be played back when the receiving unit receives the audio data, or should be played back after an instruction is input by a user; and playing back the audio data in accordance with the playback method. This fulfills the second object.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 shows an example data structure of a forwarding method stored in a control method storing unit 206 according to an embodiment of the present invention;

FIG. 10 shows an example of a job operation screen used for controlling jobs of an MFP 10*a* according to an embodiment of the present invention:

FIG. 13 shows an example of a job operation screen of an MFP 10a according to an embodiment of the present invention; and FIG. 14 shows an example of a job operation screen of an MFP 10a according to an embodiment of the present invention.

DESCRIPTION OF THE PREFERRED EMBODIMENT

The following describes an embodiment of a image forming apparatus according to an embodiment of the present invention, by taking an internet facsimile system (hereinafter called the "fax system") as an example, with reference to drawings.

1. Structure of Fax System

Figure 1:
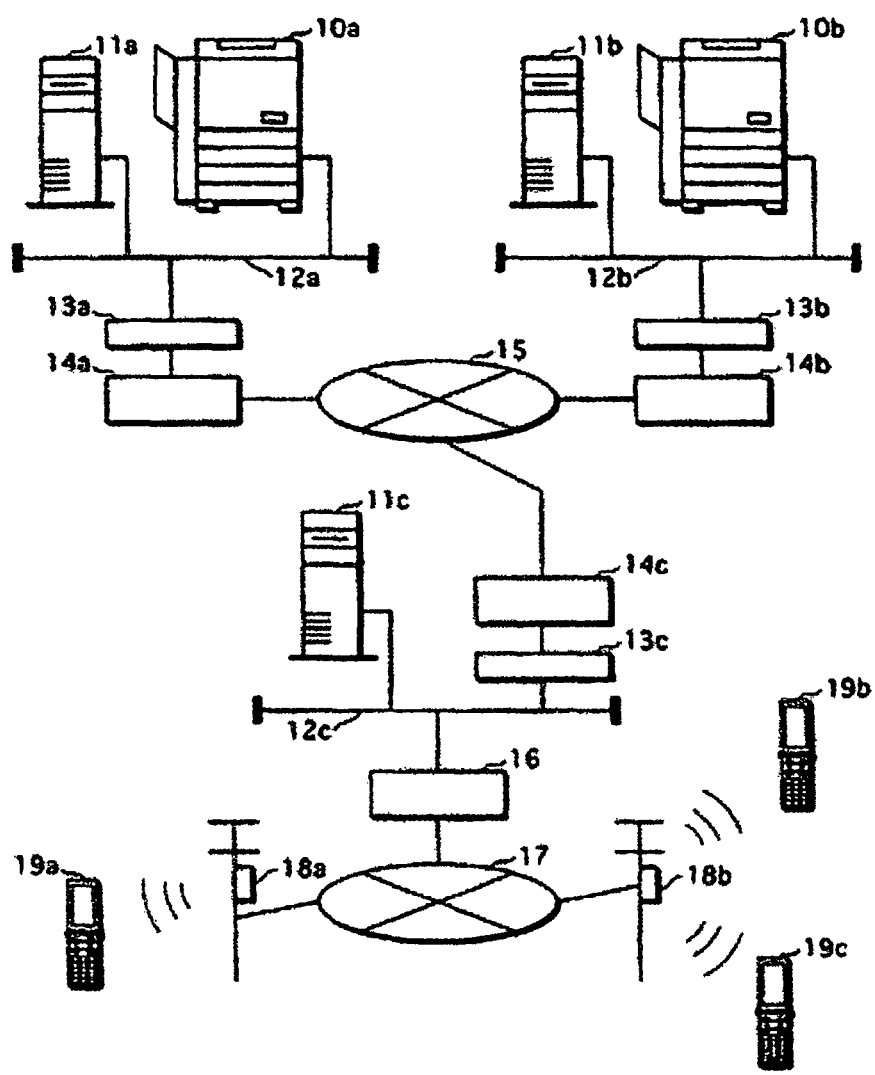
FIG. 1 shows a system structure of a fax system according to an embodiment of the present invention.

The following describes the structure of the fax system according to the embodiment of the present invention. FIG. 1 is a block diagram showing a structure of the fax system according to the embodiment of the present invention. As FIG. 1 shows, a fax system 1 includes MFPs (Multiple Functional Peripheral) 10a and 10b, E-mail servers 11a to 11c, LANs (Local Area Networks) 12a to 12c, firewalls 13a to 13c, routers 14a to 14c, an internet 15, a gateway 16, a telephone network 17, base stations 18a and 18b, and mobile telephones 19a to 19c.

The MFP 10a, the E-mail server 11a, the firewall 13a and the router 14a, which are connected to the LAN 12a, constitute a private network. The MFP 10b, the E-mail server 11b, the firewall 13b and the router 14b, which are connected to the LAN 12b, constitute a private network as well.

Also, the E-mail server 11c, the firewall 13c, the router 14, and the gateway 16, which are connected to the LAN 12c, constitute a private network. The gateway 16 connects the private network 12c and the telephone network 17. Accordingly, E-mails can be exchanged among the networks.

The base stations 18a and 18b are installed in the telephone network 17, each of which receives E-mails from the mobile telephones 19a to 19c and transmits E-mails to the mobile telephones. Needless to say, the numbers of the MFPs, the E-mail servers, the mobile telephones and so on, which constitute the fax system 1, are not limited to the above described numbers.

2. Structure of MFP

The following describes the structure of the MFP 10a. Note that the structure of the MFP 10b is the same as the structure of the MFP 10a. Therefore, only the structure of the MFP 10a is described here.

Figure 2:
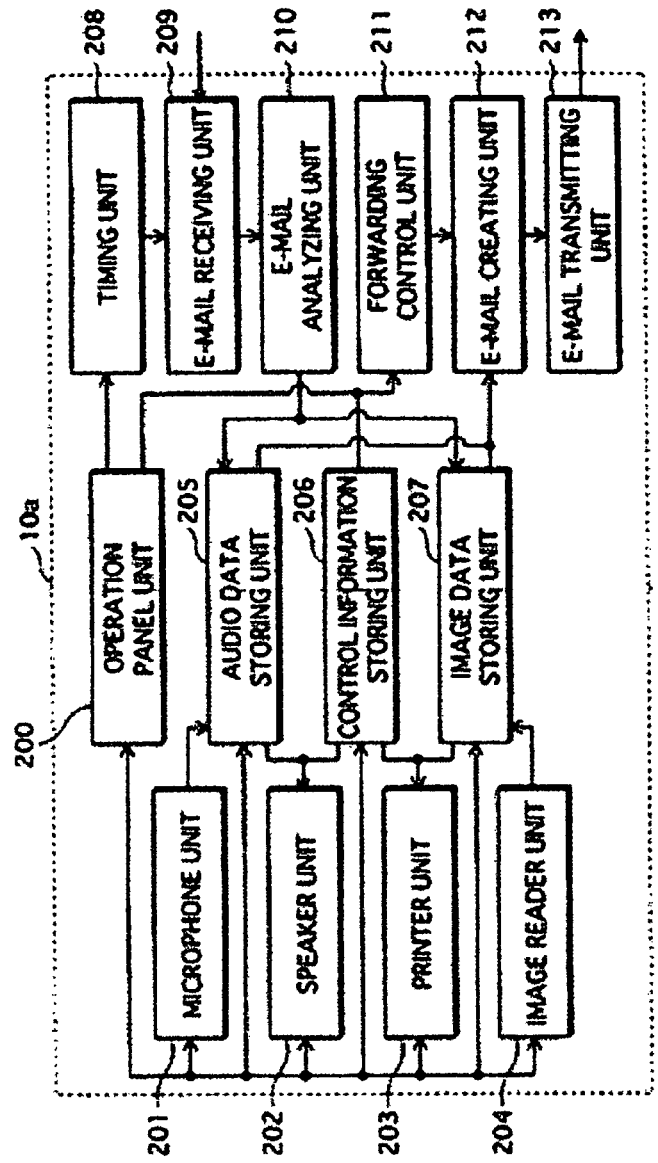
FIG. 2 is a functional block diagram showing a structure of an MFP 10*a* according to an embodiment of the present invention.

FIG. 2 is a functional block diagram showing the structure of the MFP 10a. As FIG. 2 shows, the MFP 10a includes an operation panel unit 200, a microphone unit 201, a speaker unit 202, a printer unit 203, an image reader unit 204, an audio data storing unit 205, a control information storing unit 206, an image data storing unit 207, a timing unit 208, an E-mail receiving unit 209, an E-mail analyzing unit 210, a forwarding control unit 211, an E-mail creating unit 212, and an E-mail transmitting unit 213.

The operation panel unit 200 includes a liquid crystal panel, a numeric keypad and so on, and receives instructions from the user to send a fax, to read a document, to record a sound, and so on. The operation panel unit 200 also receives selection of methods used for playing back audio data and printing out image data, and makes the control information storing unit 206 store the selection.

The microphone unit 201 converts a sound into an electronic signal to generate digital audio data (hereinafter simply called "audio data") according to an instruction input from the operation panel unit 200. For instance, the microphone unit 201 may digitize the electronic signal by PCM (pulse code modulation), and compress the digitized data in a format in conformity with MP3 (MPEG Audio Layer 3). The digitized data may be compressed in a format in conformity with other formats, such as WAV (wave) format and WMA (Windows Media Audio) format.

The speaker unit 202 outputs audio data that is stored in the audio data storing unit 205 in accordance with a playback method stored in the control information storing unit 206.

The printer unit 203 prints out image data that is stored in the image data storing unit 207, in accordance with a print method stored in the control information storing unit 206.

The image reader unit 204 reads image data from a document. For instance, the image reader unit 204 irradiates a document, which has been fed from a document tray to a platen glass by an ADF (Automatic Document Feeder), and converts a light reflected from the document into electronic signals by CCD (Charge Coupled Device) sensors.

The image reading unit 204 performs image processing on the image data. The image processing includes shading correction, reflectivity-density conversion, MTF correction, density correction, and thresholding such as error diffusion, and the like. After performing the image processing, the image reading unit 204 compresses the image data to generate digital image data (hereinafter simply called "image data").

The audio data storing unit 205 stores audio data generated by the microphone unit 201. The audio data storing unit 205 also stores audio data attached to an E-mail received by the MFP 10a. The audio data storing unit 205 deletes audio data stored therein, in accordance with the instructions from the operation panel unit 200 and control information stored in the control information storing unit 206.

The control information storing unit 206 stores a method for playing back audio data stored in the audio data storing unit 205, a method for printing out image data stored in the image data storing unit 207, a method for deleting audio data stored in the audio data storing unit 205 and image data stored in the image data storing unit 207, and a method for specifying and forwarding one of or both of audio data and image data included in composite data.

Here, the method for playing back audio data shows either automatically playing back the audio data upon receiving the composite data or playing back after receiving an instruction from the user.

The method for deleting audio data and image data shows, if one of audio data and image data relating to composite data is played back or printed out, whether the data that is not played back or printed out should be automatically deleted without the user's instruction.

Accordingly, if the method for deleting shows that the data should be automatically deleted without the user's instruction and when the image data is printed out, the image data is to be deleted and the audio data relating to the same composition data is to be deleted.

The image data storing unit 207 stores image data generated by the image reader unit 204. The image data storing unit 207 also stores image data attached to an E-mail received by the MFP 10a. The image data storing unit 207 also deletes image data stored therein, in accordance with an instruction from the operation panel unit 200 and the control information stored in the control information storing unit 206.

The timing unit 208 includes a timer, and notifies the E-mail receiving unit 209 at predetermined time intervals and instructs the E-mail receiving unit 209 to receive an E-mail. The timing unit 208 receives the setting of the predetermined time interval from the operation panel unit 200.

The E-mail receiving unit 209 receives the notification from the timing unit 208 at the predetermined time intervals, and receives an E-mail addressed to the MFP 10a from the E-mail server 11a in accordance with, for instance, POP3 (post office protocol version 3, RFC1939).

The E-mail analyzing unit 210 analyzes an E-mail received by the E-mail receiving unit 209, and obtains image data and audio data attached to the E-mail. Audio data and image data attached to an E-mail are respectively to be stored in the audio data storing unit 205 and the image data storing unit 207 in association with each other.

In accordance with the instructions from the operation panel 200, the forwarding control unit 211 instructs the E-mail creating unit 212 to create an E-mail to which specified image data and audio data are attached.

In accordance with instructions from the forwarding control unit 211, the E-mail creating unit 212 creates an E-mail to which image data stored in the image data storing unit 207 is attached in a manner that is in conformity with the internet fax standard. The E-mail creating unit 212 also obtains the audio data, which is associated with the image data, from the audio data storing unit 205, and attaches the audio data to the E-mail.

The E-mail transmitting unit 213 transmits the E-mail that is created by the E-mail creating unit 212. The E-mail transmitting unit 213 transmits the E-mail to the E-mail server 11a in accordance with SMTP (Simple Mail Transfer Protocol, RFC821), for instance.

3. Processing Performed by MFP

The following describes the processing performed by the MFP 10a. Note that the processing performed by the MFP 10b is the same as the processing performed by the MFP 10b. Therefore, only the processing performed by the MFP 10a is described here.

(1) Processing for Transmission

Figure 3:
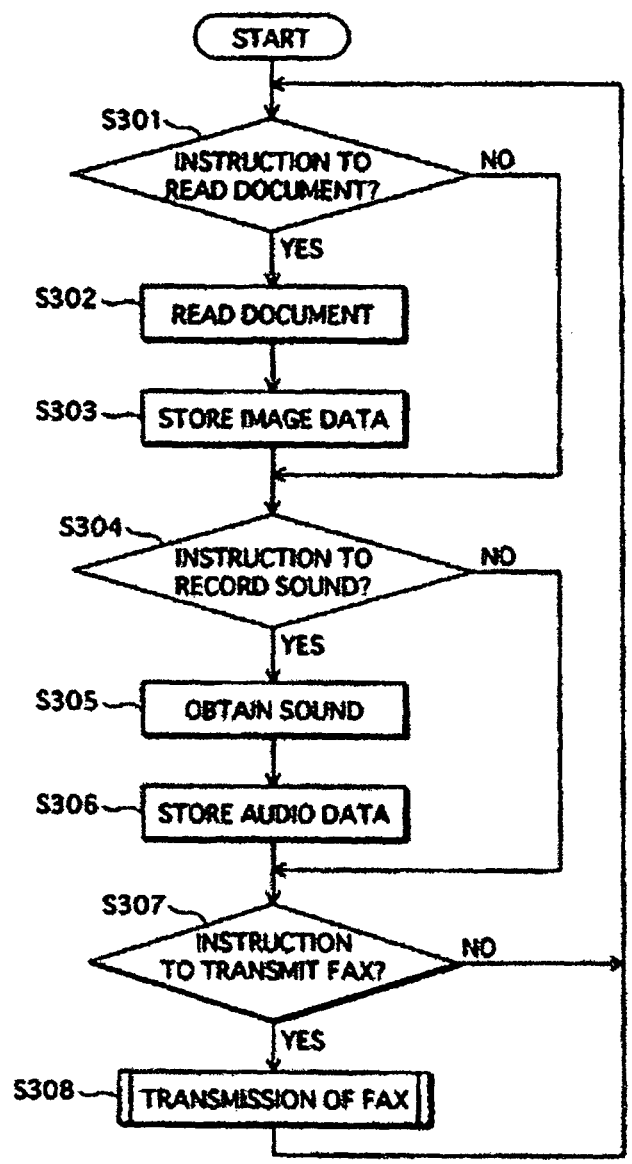
FIG. 3 is a flowchart showing a procedure for transmitting a fax, performed by an MFP 10*a* according to an embodiment of the present invention.

Firstly, processing performed by the MFP 10a for transmitting a facsimile is described next. FIG. 3 is a flowchart showing a procedure performed by the MFP 10a for transmitting a fax. As FIG. 3 shows, upon receiving the user's instruction input from the operation panel unit 200 to read the document (S301: YES), the MFP 10a reads the document by the image reader unit 204 to generate image data (S302), and makes the image data storing unit 207 store the image data (S303).

If the image data storing unit 207 has stored the image data or the MFP 10a has not received the instruction to read the document (S301: NO), and if the MFP 10a has received the user's instruction input from the operation panel unit 200 to record the sound (S304: YES), the MFP 10a obtains the sound by the microphone unit 201 to generate audio data (S305). The audio data obtained in this way is to be associated with the image data that relates to the specification of the image data, and to be stored in the audio data storing unit 205 (S306).

If the audio data storing unit 205 has stored the audio data or the MFP 10a has not received the instruction to record the sound (S304: NO), and if the MFP 10a received the user's instruction to transmit a fax from the operation panel 200 (S307: YES), the MFP 10a performs transmission of the fax including the specified image data and the audio data (S308).

If the MFP 10a has finished the transmission of the fax, or the MFP 10a has not received the instruction to transmit the fax (S307: NO), the MFP 10a repeats the above-described processing.

(1-1) Processing for Transmitting Fax (S308)

Figure 4:
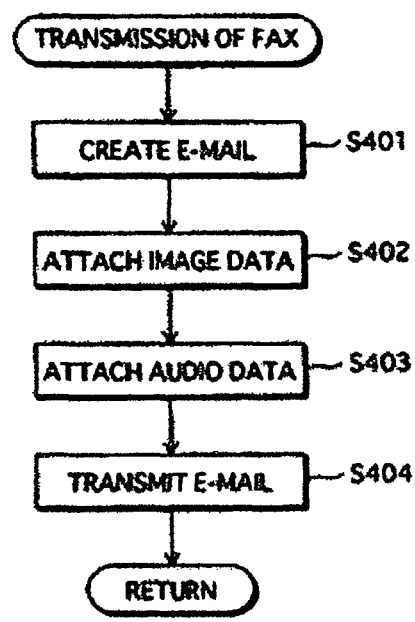
FIG. 4 is a flowchart showing a procedure of fax transmission performed by an MFP 10*a* according to an embodiment of the present invention.

The following describes the transmission of the fax (S308) in detail. FIG. 4 is a flowchart showing the transmission of the fax performed by the MFP 10a. As FIG. 4 shows, the MFP 10a firstly creates an E-mail by the E-mail creating unit 212 (S401). The forwarding destination specified by the user is described in the "To field" of the header part included in the E-mail. Then, the MFP 10a reads out the image data, which relates to the composite data specified by the user, from the image data storing unit 207, and attaches the read-out image data to the E-mail (S402). Furthermore, the MFP 10a reads out the audio data relating to the same composite data from the audio data storing unit 205, and attaches the read-out audio data to the E-mail (S403). Finally, the MFP 10a transmits the E-mail by the E-mail transmitting unit 213 (S404), and the processing returns to the main routine.

The MFP 10a performs the same processing not only in the case of forwarding composite data received from others, but also in the case of transmitting composite data that includes audio data generated by the microphone unit 201 and image data generated by the image reader unit 204.

(2) Processing for Reception

Figure 5:
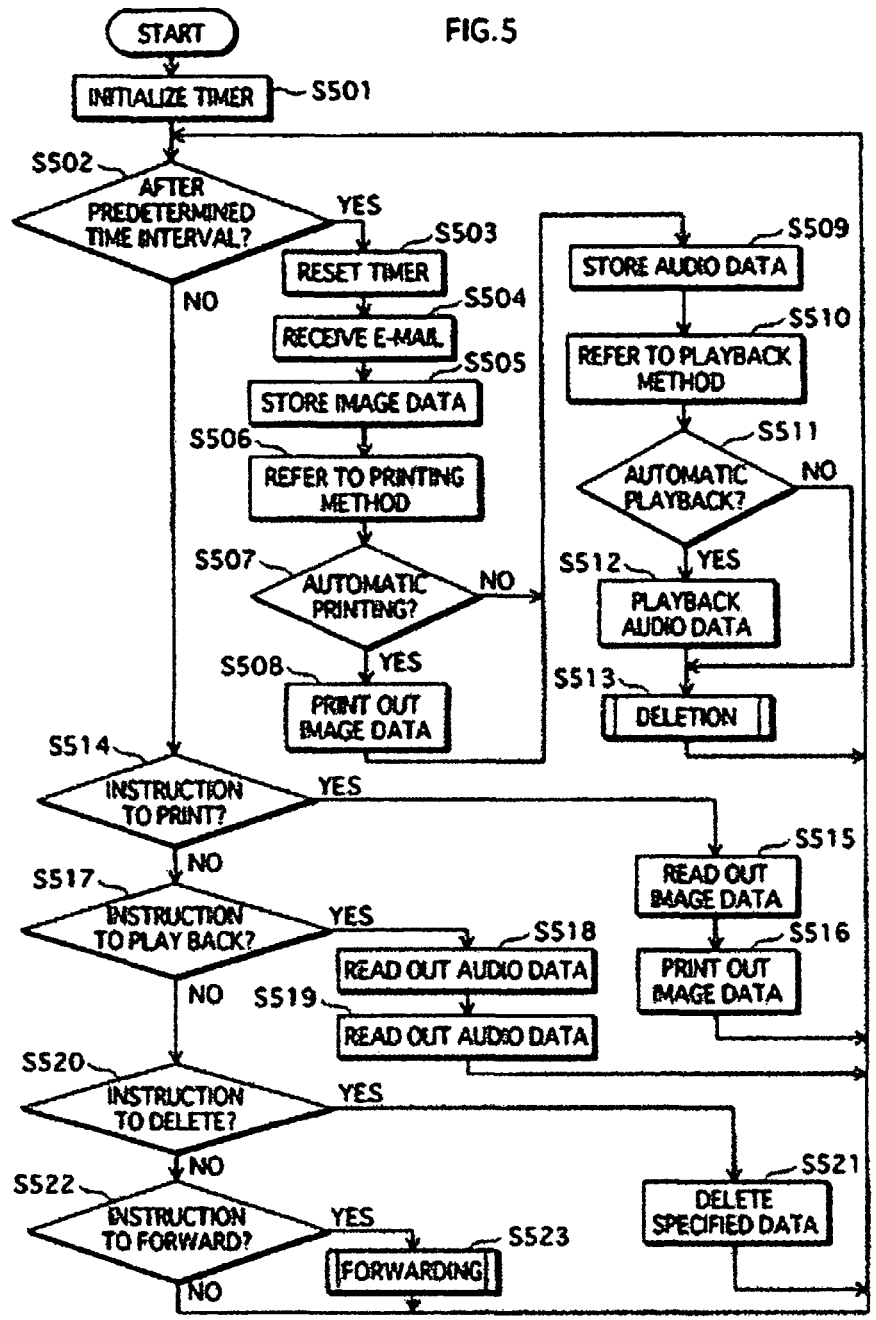
FIG. 5 is a flowchart showing a procedure for receiving a fax, performed by an MFP 10*a* according to an embodiment of the present invention.

The following describes the processing performed by the MFP 10a for receiving a fax. FIG. 5 is a flowchart showing the processing performed by the MFP 10a for receiving a fax. As FIG. 5 shows, the MFP 10a initializes the timer, which is included in the timing unit 208, at the time of the starting up (S501). Accordingly, the timing unit 208 notifies the E-mail receiving unit 209 after the predetermined time interval.

After the predetermined time interval, upon notifying the E-mail receiving unit 209 (S502: YES), the timing unit 208 resets the timer (S503). Accordingly, after another predetermined time interval, the timing unit 208 notifies the E-mail receiving unit 209 again.

Then, the MFP 10a accesses the E-mail server 11a by the E-mail receiving unit 209 to obtain an E-mail addressed to the MFP 10a itself (S504), reads out image data, which is attached to the E-mail, by the E-mail analyzing unit 210, and makes the image data storing unit 207 store the image data (S505).

The MFP 10a refers to the method for printing which is stored in the control information storing unit 206 (S506). If the method is set up so that the MFP 10a automatically prints out the image data (S507: YES), the MFP 10a prints out the image data by the printer unit 203 (S508).

If the MFP 10a has printed out the image data or the method is set up so that the MFP 10a does not automatically print out the image data (S507: NO), the MFP 10a makes the audio data storing unit 205 store the audio data attached to the E-mail (S509). Then, the MFP 10a refers to the method for playing back, which is stored in the control information storing unit 206 (S510). If the method is set up so that the MFP 10a automatically plays back the audio data (S511: YES), the MFP 10a plays back the audio data by the speaker unit 202 (S512).

If the MFP 10a has played back the audio data or the method is set up so that the MFP 10a does not automatically play back the audio data (S511: NO), the MFP 10a performs processing for deletion (S513), which is described later.

Upon receiving the user's instruction to print out the image data stored in the image data storing unit 207 (S514: YES), which is input from the operation panel unit 200, the MFP 10a reads out the image data, which relates to the instruction to print, from the image data storing unit 207 (S515), and prints out the image data by the printer unit 203 (S516).

Upon receiving the user's instruction to play back the audio data stored in the audio data storing unit 205 (S517: YES), which is input from the operation panel unit 200, the MFP 10a reads out the audio, which relates to the instruction to play back, from the audio data storing unit 205 (S518), and plays back the audio data by the speaker unit 202 (S519).

Upon receiving the user's instruction to delete the composite data specified by the user (S520: YES), which is input from the operation panel 200, the MFP 10a deletes the audio data relating to the composite data from the audio data storing unit 205, and deletes the image data relating to the composite data from the image data storing unit 207 (S521).

Upon receiving the user's instruction to transmit the composite data specified by the user 200 (S522: YES), which is input from the operation panel, the MFP 10a forwards the specified composite data (S523).

(2-1) Processing for Deletion (S513)

Figure 6:
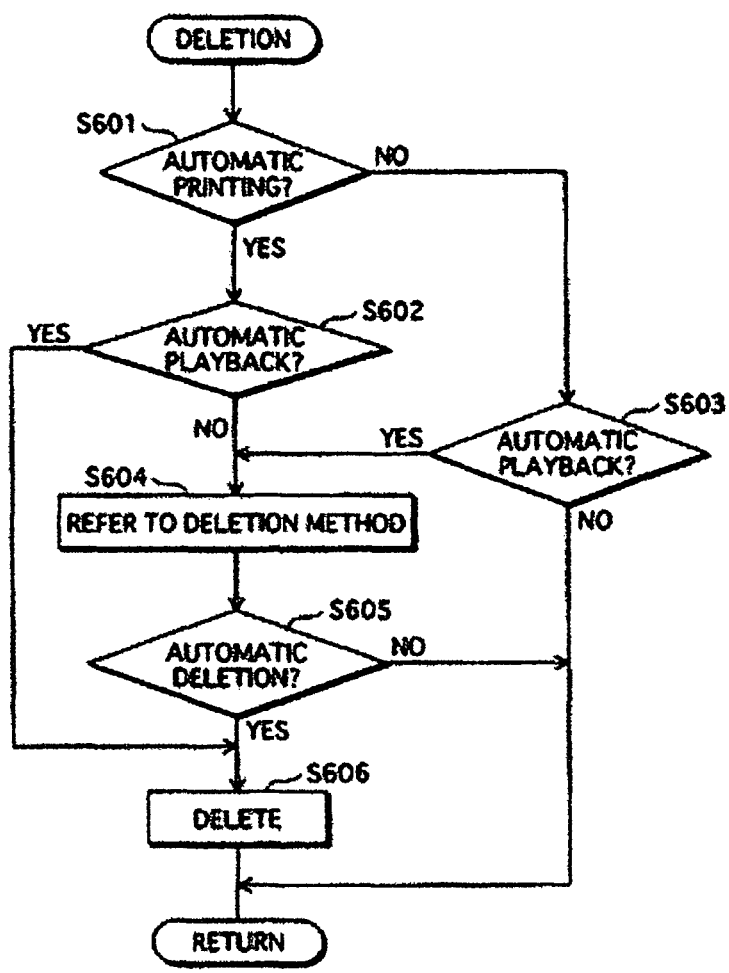
FIG. 6 is a flowchart showing a procedure of deletion performed by an MFP 10*a* according to an embodiment of the present invention.

The following describes the processing for deletion (S513) in detail. FIG. 6 is a flowchart showing the processing for deleting data performed by the MFP 10a. As FIG. 6 shows, if the image data has been printed out (S601: YES) and the audio data has not been played back (S602: NO), the MFP 10a reads out the method for deletion from the control information storing unit 206 (S604). Then, if the method for deletion is set up so that the MFP 10a automatically delete data (S 605: YES), the MFP 10a deletes the image data and the audio data (S606).

In the same manner, if the image data has not been printed out (S601: NO) and the audio data has been played back (S602: YES), the MFP 10a deletes the image data and the audio data (S606).

Furthermore, if the image data has been printed out (S601: YES) and the audio data has been played back (S602: YES), the MFP 10a deletes the image data and the audio data (S606).

Meanwhile, if the image data has not been printed out (S601: NO) and the audio data has not been played back (S602: NO), the MFP 10a deletes neither image data nor audio data. Even in other cases, if the method is set up so that the MFP 10a does not automatically delete data (S605: NO), the MFP 10a deletes neither the image data nor the audio data, and finishes the processing.

(2-2) Processing for Forwarding (S525)

Figure 7:
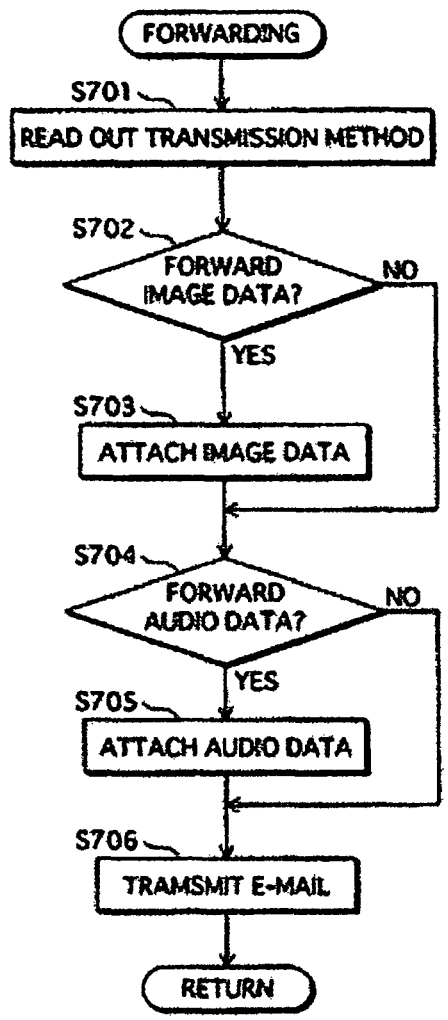
FIG. 7 is a flowchart showing a procedure of forwarding performed by an MFP 10*a* according to an embodiment of the present invention.

The following describes the processing for forwarding (S525) in detail. FIG. 7 is a flowchart showing a procedure for forwarding performed by the MFP 10a. As FIG. 7 shows, the MFP 10a reads out the method for forwarding from the control information storing unit 206 (S701), and obtains information as to whether the image data should be forwarded to the forwarding destination specified by the user. If it should be forwarded (S702: YES), the MFP 10a attaches the image data to the E-mail by the E-mail creating unit 212 (S703).

FIG. 8 is a table showing an example data structure of the forwarding method stored in the control information storing unit 206. The method for forwarding indicates, for each forwarding destination, whether each of the image data and audio data should be forwarded. For instance, in FIG. 8, both image data and audio data should be forwarded to the forwarding destination "abc@def.com". In the same manner, only image data should be forwarded to a destination address "ghi@jkl.co.jp", and only audio data should be forwarded to a destination address "mno@pqr.ne.jp".

Accordingly, if the forwarding destination is a device that is not suitable for displaying images, like a mobile telephone, the MFP 10a can selectively forward only the audio data to the device. Also, if the forwarding destination is a device that can not output a sound, like a copy machine without a speaker, the MFP 10a can selectively forward only image data to the device.

If the MFP 10a has attached the image data or the MFP 10a does not forward the image data (S702: NO), the MFP 10a reads out the method for transmission from the control information storing unit 206 (S 701), and obtains information as to whether the audio data should be forwarded to the forwarding destination. If the audio data should be forwarded (S704: YES), the MFP 10a attaches the audio data to the E-mail by the E-mail creating unit 212 (S705).

If the MFP 10a has attached the audio data or the MFP 10a does not forward the audio data (S704: NO), the MFP 10a transmits the E-mail by the E-mail transmitting unit 213, and finishes the processing for the transmission (S706).

(3) Example Operations

The following describes example operations of the MFP 10a using the operation panel 200.

(3-1) Setting of Control Information

Figure 9:
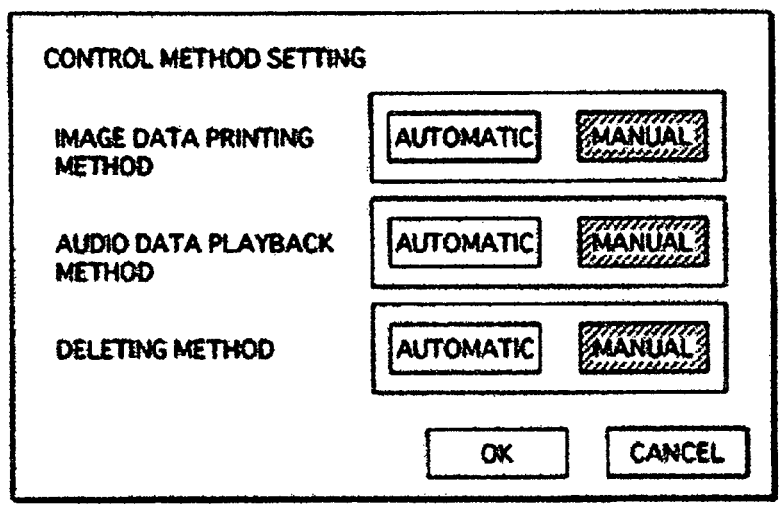
FIG. 9 shows an example of a control information setting screen used for setting control information to an MFP 10*a* according to an embodiment of the present invention.

FIG. 9 shows an example of a control information setting screen used for setting the control information. As FIG. 9 shows, the control information setting screen includes buttons used for selecting "automatic" or "manual" for each of methods for printing out image data, playing back audio data, and deleting data. The screen also includes an "OK" button used for reflecting the selection on the processing of the MFP 10a, and a "cancel" button used for canceling the selection.

(3-2) Job Operation (Part 1)

FIG. 10 shows an example of a job operation screen used for controlling jobs. As FIG. 10 shows, the job operation screen displays job numbers and job information. The job operation screen includes a "print" button used for printing out image data relating to the job, a "playback" button used for playing back audio data relating to the job, a "forward" button used for forwarding the job, and "delete" button used for deleting the job.

(3-3) Forwarding of Job

Figure 11:
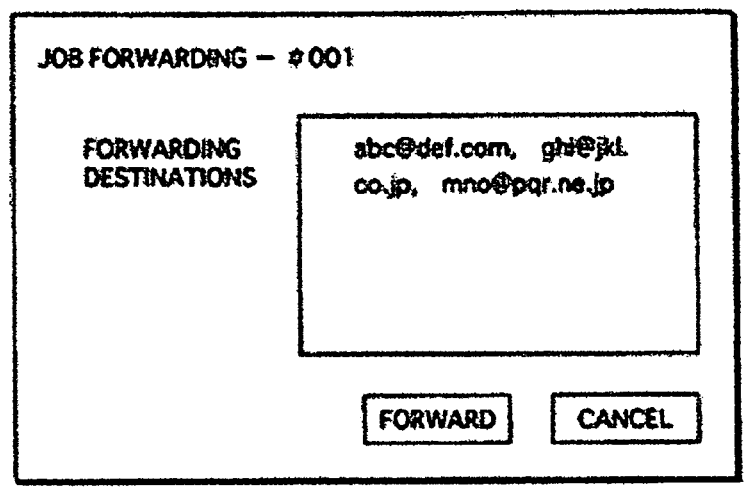
FIG. 11 shows an example of a job forwarding screen used for making an MFP 10*a* according to an embodiment of the present invention forward a job.

FIG. 11 shows an example of a job forwarding screen used for forwarding jobs. As FIG. 11 shows, the fob forwarding screen includes a text field in which the forwarding destination of the job is to be input, a "forward" button used for forwarding the job, and a "cancel" button used for canceling the job. The user can input the forwarding destination using the operation buttons of the operation panel unit 200, and forward the job by selecting the "forward" button.

(3-4) Deletion of Job

Figure 12:
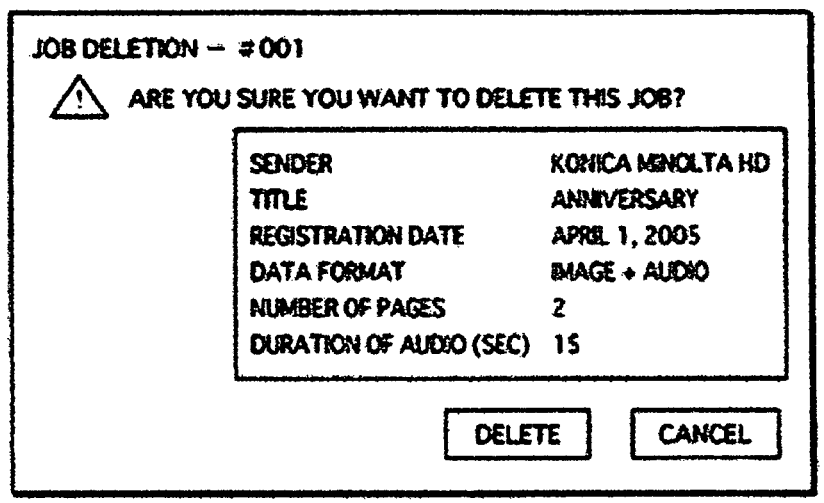
FIG. 12 shows an example of a job deletion screen used for making an MFP 10*a* according to an embodiment of the present invention delete a job.

FIG. 12 shows an example of a job deletion screen used for deleting a job. As FIG. 12 shows, the job deletion screen includes a job number and job information of the job to be deleted, a "delete" button used for deleting the job, and a "cancel" button used for canceling the deletion of the job. Once a job is deleted, the job can not be recovered. Therefore, a warning icon and a warning message, which says "Are you sure you want to delete this job?", are to be displayed.

(3-5) Job Operation (Part 2)

FIG. 13 shows an example of a job operation screen. If there is no sound data relating to the job, the duration of the sound data (the number of seconds) is not displayed. Also, the "playback" button is displayed with shading, which means that the "playback" button is not active. If the playback button is pressed, warning beep will be made to warn the user.

(3-6) Job Operation (Part 3)

FIG. 14 shows an example of the job operation screen. If there is no image data relating to the job, the number of pages included in the image data is not displayed. Also, the "print" button is displayed with shading, which means that the "print" button is not active. If the "print" button is pressed, warning beep will be made to warn the user.

4. Operation of Mobile Telephone

The following describes the operations of the mobile telephone 19a. Note that the mobile telephones 19b and 19c operate in the same manner as the mobile telephone 19a, and therefore only the operations of the mobile telephone 19a are described here.

The mobile telephone 19a operates as a normal mobile telephone. Additionally, the mobile telephone 19a receives an E-mail from the MFP 10a and so on, and stores the E-mail. The mobile telephone 19a plays back audio data, which is attached to the stored E-mail, according to an instruction from the user.

As described above, it is possible to set the method for forwarding so that the MFP 10a does not attach image data to the E-mail that is to be forwarded to the mobile telephone 19a. Accordingly, the mobile telephone 19a is prevented from storing useless data which the mobile telephone 19a can not display. Therefore, it is possible to save storage space used for storing an E-mail.

5. Example Applications

The fax system according to the embodiment of the present invention is applicable in the field of medicine, for instance. It is possible to receive an E-mail to which an X-ray picture as the image data, and heart sounds and breathing sounds as the audio data is attached. In the filed of music, CD jacket as the image data, and music contents of the CD as the audio data may be attached. A musical score as the image data and the performance as the audio data may be attached as well. Furthermore, in the field of language learning, texts as the image data and pronunciation examples as the audio data may be attached to the E-mail. A picture book as image data and reading voice as the audio data may be attached as well.

In the case where a problem happens with an MFP that has an internet facsimile function, an abnormal noise that seems to relate to the problem may be recorded and faxed with a problem report. In the case where a sales representative is transferred to another post, voice data may be attached to a letter of greeting to be faxed to the customers. With the audio data, the intention of the sender (nuances in words) can be conveyed to the recipients.

In the above-described cases, the present invention can improve the security as to the audio data that is combined with the image data and to be faxed. Also, in the case of transmitting a document to a person and requesting the person to distribute copies of the document, the sender can attach a message including notes and explanations for the distribution as the audio data, instead of a written message. This prevents the person from distributing the written message by mistake.

6. Modifications

The present invention is described above based on the embodiment of the present invention. However, needless to say, the present invention is not limited to the embodiment. The following are possible modifications.

(1) The above described embodiment mainly describes the case where the image data and so on are transmitted according to the user's instruction. However, the present invention is not limited to this. The flowing modification may be made.

The transmission may be performed immediately after the reception of the E-mail, based on forwarding destinations prestored in the MFP, without user's instruction. In this case, if whether to transmit the image data or whether to transmit the audio data is judged based the forwarding destinations as described above, it is possible to avoid that unavailable data is forwarded to the destinations. This reduces the network load and saves resources, such as a storage space of a device that receives the data.

Here, a forwarding destination may be previously registered for each mail source and the data may be transmitted according to the registration. Also, the forwarding destination may be determined with reference to other part included in the E-mail, such as the subject field in the header.

(2) The embodiment above mainly describes the case where the forwarding method stored in the forwarding method storing unit indicates whether the image data and so on can be forwarded. However, the present invention is not limited to this as a matter of course. The following is a possible modification.

If the forwarding destination has a small display unit such as a liquid crystal panel, it is possible to forward a reduced-size image, namely a thumbnail of the image data, instead of the image data. The thumbnail gives the user a general view of the image data. Therefore, the user can more clearly grasp what to be conveyed by the composite data, compared to the case where no image data is forwarded.

(3) The embodiment above mainly describes the case where the forwarding method stored in the forwarding method storing unit indicates whether the image data and so on can be forwarded. However, the present invention is not limited to this as a matter of course. The following is a possible modification.

In paper work, which is the main use of the MFPs, the MFPs almost always handle documents that do not include images. Therefore, if the forwarding destination is a mobile telephone or a portable terminal device, having a small display unit such as a liquid crystal panel, text data that is converted from the image data to text data by character recognition may be forwarded instead of the image data. This is effective because the user who receives the data can grasp what the image data represents to some extent.

(4) In the embodiment above mainly describes the case where the forwarding method stored in the forwarding method storing unit indicates whether the audio data and so on can be forwarded. However, the present invention is not limited to this as a matter of course. The following is a possible modification.

If the forwarding destination does not have a unit for playing back the audio data, and if the audio is a speech or the like that can be converted to text data by audio recognition, the converted text data may be forwarded instead of the audio data. This is effective because the user who receives the data can grasp what the audio data represents to some extent.

Needless to say, even if the forwarding destination device can playback the audio data, the text data converted from the audio data may be additionally forwarded to the forwarding destination.

(5) The embodiment above mainly describes the case where the image data and so on are transmitted according to the user's instruction input from the operation panel unit.

However, the present invention is not limited to this. The following is a possible modification.

The image data and so on may be transmitted according to an instruction from other device. If this is the case, once forwarding the data according to the instruction from the device, the MFP may not forward data until receiving next instruction from the device, in order to prevent duplication of the data.

Also, the MFP may regularly check whether data that is not forwarded is stored in the image data storage unit or the audio data storage unit, and if stored, the MFP may forward the data. This brings about the same effect as described above.

(6) The embodiment above mainly describes the case where the user's instruction is input from the operation panel unit. However, the present invention is not limited to this as a matter of course. The following is a possible modification.

As described in the modification (5), the MFP according to the present invention may forward the data according to a request from other device for forwarding data. If this is the case, it is preferable that the device is a mobile telephone or a portable terminal device.

The MFP may perform operations such as forwarding of image data and so on, and printing or deleting of the data stored in the MFP, according to a request from the mobile telephone and so on that is used like a remote control device.

The mobile telephone has a microphone. Therefore, the audio data may be recorded with use of the microphone of the mobile telephone instead of installing a microphone unit in the MFP.

Usually, the MFP is not portable because of its size and weight. However, the above-described modification allows the user to perform various operations without being tied to the location where the MFP is set up.

(7) The embodiment above mainly describes the case where an E-mail is used for receiving and transmitting the image data and so on. However, the present invention is not limited to this as a matter of course. Other communication tools may be used for receiving and transmitting the image data and so on.

(8) The embodiment above mainly describes the case where an E-mail is forwarded to the forwarding destinations which are registered at the MFP. However, the present invention is not limited to this as a matter of course. The following is a possible modification.

A forwarding device may be additionally set up to forward data, and all the data may be transferred to the forwarding device. The forwarding device may judge whether to forward the data. This allows a plurality of MFPs to share the forwarding device. Therefore, it becomes possible to save the effort of setting the forwarding method.

This is also convenient because it is not necessary to judge where the desired data is stored, even in the case where the forwarding of the data is requested from a mobile telephone or another device.

(9) The embodiment above mainly describes the case of handling composite data including image data and audio data. However, the present invention is not limited to this as a matter of course. Other data, such as moving picture data, may be handled.

(10) The embodiment above mainly describes the apparatus according to the present invention. However, the present invention is not limited to this as a matter of course. The present invention may be a composite data processing method for processing the composite data as described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus, comprising:
   a receiving unit operable to receive composite data comprising image data and audio data associated with each other;
   a playback method storing unit configured so as to prestore therein a selection of a first playback method that indicates separately for the audio data that the audio data comprised in the composite data should be played back when the receiving unit receives the composite data, and a second playback method that indicates separately for the audio data that the audio data comprised in the composite data should be played back after an instruction is input by a user;
   a playback unit operable to playback the audio data in accordance with the playback method that is prestored in the playback method storing unit;
   an image data storing unit storing therein the image data comprised in the composite data;
   an audio data storing unit storing therein the audio data comprised in the composite data;
   a delete method storing unit prestoring therein a delete method that indicates, when the audio data comprised in the composite data is played back, whether the image data comprised in the composite data should be automatically deleted without an instruction from the user, or should be deleted after the instruction from the user; and
   a delete unit operable to delete, when the audio data comprised in the composite data is played back in case of the delete method indicates that the image data comprised in the composite data should be automatically deleted, the image data comprised in the composite data as well as the played-back audio data even when the image data comprised in the composite data has not been printed.

2. The image forming apparatus of claim 1, further comprising:
   a print method storing unit prestoring therein a print method that indicates whether the image data comprised in the composite data should be printed when the receiving unit receives the composite data, or should be printed after an instruction is input by the user; and
   a printing unit operable to print the image data in accordance with the print method that is prestored in the print method storing unit;
   wherein the delete method prestored in the delete method storing unit further indicates, when the image data comprised in the composite data is printed, whether the audio data comprised in the composite data should be automatically deleted without an instruction from the user, or should be deleted after the instruction from the user; and
   the delete unit is operable to delete, when the image data comprised in the composite data is printed in case of the delete method indicates that the audio data comprised in the composite data should be automatically deleted, the audio data comprised in the composite data as well as the printed image data even when the audio data comprised in the composite data has not been played back.

3. The image forming apparatus of claim 1, wherein the receiving unit receives the composite data by receiving an E-mail attached with the image data and audio data comprised in the composite data.

4. The image forming apparatus of claim 3, wherein the receiving unit receives an E-mail to which the image data is attached in conformity with a standard of an Internet facsimile.

5. A composite data processing method, comprising:

receiving composite data comprising image data and audio data associated with each other;

storing the image data comprised in the composite data;

storing the audio data comprised in the composite data;

providing a playback method storing unit configured so as to prestore therein a selection of a first playback method that indicates separately for the audio data that the audio data comprised in the composite data should be played back when the receiving unit receives the composite data, and a second playback method that indicates separately for the audio data that the audio data comprised in the composite data should be played back after an instruction is input by a user;

prestoring in the playback method storing unit a playback method that indicates separately for the audio data whether the audio data comprised in the composite data should be played back when the audio data is received in the receiving step, or should be played back after an instruction is input by a user;

playing back the audio data in accordance with the prestored playback method;

prestoring a delete method that indicates, when the audio data comprised in the composite data is played back, whether the image data comprised in the composite data should be automatically deleted without an instruction from the user, or should be deleted after the instruction from the user; and deleting, when the audio data comprised in the composite data is played back in case of the delete method indicates that the image data comprised in the composite data should be automatically deleted, the image data comprised in the composite data as well as the played-back audio data even when the image data comprised in the composite data has not been printed.

6. The composite data processing method of claim 5, further comprising:

prestoring a print method that indicates whether the image data comprised in the composite data should be printed when the composite data is received in the receiving step, or should be printed after an instruction is input by the user; and printing the image data in accordance with the prestored print method;

wherein the prestored delete method further indicates, when the image data comprised in the composite data is printed, whether the audio data comprised in the composite data should be automatically deleted without an instruction from the user, or should be deleted after the instruction from the user; and when the image data comprised in the composite data is printed in case of the delete method indicates that the audio data comprised in the composite data should be automatically deleted, the audio data comprised in the composite data and the printed image data are deleted even when the audio data comprised in the composite data has not been played back.

* * * * *